United States Patent

Wieczorek

[11] 4,029,836
[45] June 14, 1977

[54] RESILIENT HEAT RESISTANT LAMINATED COMPOSITE

[75] Inventor: Leonard Wieczorek, Golden, Colo.

[73] Assignee: Coors Porcelain Company, Golden, Colo.

[22] Filed: Sept. 15, 1976

[21] Appl. No.: 723,428

Related U.S. Application Data

[63] Continuation of Ser. No. 547,302, Feb. 5, 1975, abandoned.

[52] U.S. Cl. .............................. 428/246; 428/266; 428/284; 428/408; 428/447

[51] Int. Cl.² ......................................... B32B 7/00

[58] Field of Search .......... 428/246, 266, 284, 408, 428/447, 448

[56] References Cited

UNITED STATES PATENTS

| | | | |
|---|---|---|---|
| 3,239,403 | 3/1966 | Williams et al. | 156/275 |
| 3,459,917 | 8/1969 | Felts | 428/408 |
| 3,977,294 | 8/1976 | Jahn | 428/408 |

Primary Examiner—James J. Bell
Attorney, Agent, or Firm—Reising, Ethington, Barnard, Perry & Brooks

[57] ABSTRACT

In accordance with the invention, there is provided an assembly of two members having therebetween a resilient heat-resistant laminated composite consisting essentially of a plurality of layers of graphite cloth bonded together by silicone rubber, the graphite cloth forming from about 60% to 90% by volume of the composite.

6 Claims, 2 Drawing Figures

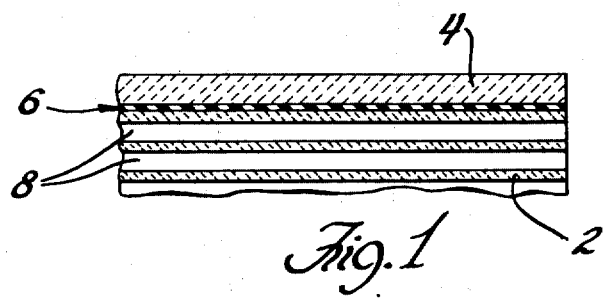
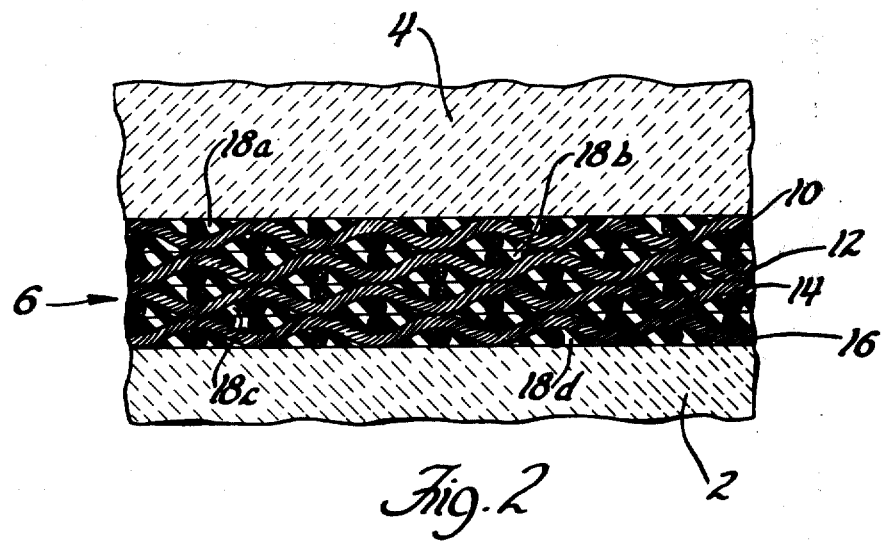

RESILIENT HEAT RESISTANT LAMINATED COMPOSITE

This is a continuation, of application Ser. No. 547,302 filed Feb. 5, 1975, now abandoned.

The subject matter of the present invention is an assembly of ceramic or other refractory members having therebetween a resilient heat resistant composite material.

There is frequently requirement for an assembly of ceramic or other refractory components which are bonded to each other and which assembly during its operation is subjected to thermal cycling or other thermal conditions resulting in different thermal expansions of the bonded components. The different thermal expansions can occur either because the components are of materials having different coefficients of thermal expansion or because the components, even though of the same material, are exposed to different temperatures. But irrespective of the reason for the differences in thermal expansion between the components, unless the bond between the components is resilient there is hazard that one or both of the components will fracture because of the resulting stresses. Hence, there is need for a resilient material which has high temperature resistance and which can be used to bond the component together to form such an assembly.

Silicone rubber has relatively high temperature resistance as compared with other organic resilient or rubber-like materials; however, even silicone rubber cannot be used for protracted periods at temperatures in excess of about 450° F without loss of its resiliency.

Briefly, what I have discovered is that by forming a laminated composite of layers of fibrous graphite bonded together by silicone rubber, the useful temperature can be extended to at least about 600° F. That is, the resulting composite of the layers of fibrous graphite bonded by the silicone rubber can be used for protracted periods at 600° F, and at even higher temperatures for shorter periods and yet with the composite retaining its resiliency. In the preferred embodiments the composite used in the assembly of the present invention contains at least about 60% by volume of the fibrous graphite, and the layers of the fibrous graphite are woven graphite cloth.

Other features and advantages of the invention will appear more clearly from the following detailed description thereof made with reference to the accompanying drawings in which:

FIG. 1 is a sectional fragmentary view of an assembly incorporating the heat resistant resilient composite of the present invention; and FIG. 2 is an enlarged sectional and fragmentary view of the assembly shown in FIG. 1.

Referring now to FIG. 1, the assembly shown comprises a cellular ceramic body 2 bonded to a dense ceramic member 4 by resilient material 6. The particular assembly of which a portion is shown in FIG. 1 is used as a heat exchanger, the passages 8 of the cellular body 2 being for the passage of hot gases therethrough. The ceramic member 4 functions as a solid strong periphery or rim for the cellular body. During operation of the assembly the thermal expansion of the ceramic member 4 differs from that of the cellular ceramic body 2 because of the difference in the temperatures to which the two components are exposed and also because in some cases the ceramic of which the member 4 is formed might be different than that used for the cellular ceramic body 2 and hence have a different coefficient of thermal expansion.

In accordance with the invention the material used for the layer 6 which bonds cellular ceramic body 2 to the ceramic member 4 is a laminate of layers of fibrous graphite bonded together by silicone rubber, the fibrous graphite preferably constituting from about 60% to 90% by volume of the composite and preferably being present in the form of graphite cloth. The fibrous graphite can be of matted or felted construction, i.e. cloth with the fibers in random orientation; but it is preferable that the cloth used be of woven construction, i.e. a construction wherein the cloth is formed of threads or yarns consisting of twisted bundles of the graphite fibers and with the threads being in a predetermined interlocked relationship with each other as is characteristic of woven cloths or fabrics.

Referring now to FIG. 2, the layer 6 contains four layers of silicone rubber-coated woven graphite cloth which are bonded together, the cloth layers being shown at 10, 12, 14 and 16 and the silicone rubber coatings for these layers being shown at 18a, 18b, 18c and 18d respectively. The cloth shown is, and should preferably be, of plain weave, and it is desirable that the cloth have a relatively open weave. In the particular construction illustrated the graphite cloth used was one marketed by the Carborundum Company of Niagara Falls, New York under the designation GSGC-2 graphite cloth and the silicone rubber used was one marketed by Dow-Corning Company of Midland, Michigan under the designation RTV-106. Further, in the particular embodiment illustrated the graphite cloth constituted about 80% by volume of the laminated composite 6, the silicone rubber constituting the remaining 20% by volume. It is in all cases preferred that the graphite fiber, e.g. the woven graphite cloth in the preferred embodiment, constitute from about 60% to 90% by volume of the composite material and the silicone rubber from 10% to 40% by volume. This range is preferred because it provides the optimum heat resistance attainable with the two materials while yet providing sufficient resilience.

The cloth used in the particular embodiment shown in FIG. 2 had a weight of about 7.5 ounces per square yard and a thickness of about 17.5 mils. To attain the optimum combination of desired characteristics it is preferred that the graphite cloth used have a thickness of from about 15 to 20 mils and that from four to six layers of the cloth be used for each ⅛ thickness of the laminated composite.

Any of the various silicone rubbers (i.e. elastomeric organosiloxane polymers) available on the market can be used in the practice of the invention, the precise molecular structure or substituted organic radical of the silicone rubber being of no importance so long as the silicone "rubber" is just that — elastomeric. The important point concerning the invention is that by way of the laminated structure of fibrous graphite layers bonded together by the silicone rubber coatings, the useful temperature range for the successful employment of silicone rubber to provide resiliency can be extended upwardly by about 150° F. Hence, where the silicone rubber is one which is prescribed by its manufacturer only for applications where it will not be exposed for extended periods to temperatures above 450° F, by the practice of the present invention that silicone rubber can be used in applications where resiliency is required and where the temperature will, for protracted periods, be as high as 600° F. While there is no certainty as to the reasons which would explain the results, it is believed that because of the particular resiliency characteristics of graphite cloth, even after prolonged exposure to high temperature, the graphite cloth complements the silicone rubber, and the silicone rubber complements the graphite cloth, in the composite to the end that any loss in the resiliency of the silicone rubber after protracted exposure to high temperatures is compensated for by the resiliency characteristics of the graphite cloth.

The structure of the composite material will still better be understood from the following description of a method for its manufacture.

The silicone rubber to be used is dissolved in sufficient solvent to provide a paste-like consistency. Typical of suitable solvents for the silicone rubbers are pentane and methyl ethyl ketone. Such formation of the silicone rubber in the solvent is coated onto the graphite cloth, as by means of a doctor blade, so as to coat the surfaces of the cloth with the paste-like formulation. It is preferred that the silicone rubber-solvent formulation not be worked into the interstices of the cloth so as to completely fill same but rather that at least some inner portion or portions of the total thickness of the cloth be left void of the silicone rubber. The solvent is then evaporated and the silicone rubber cured at such temperature as is specified or recommended by the manufacturer of the silicone rubber for the curing thereof. The amount of the silicone rubber applied should preferably be such as to result in just a thin layer of the silicone rubber over the top and bottom surfaces of the cloth.

The resulting composite sheet, consisting of the graphite cloth coated on both sides with the silicone rubber, is cut into pieces of the desired shape. The surfaces of a number of these pieces are then coated with a very thin layer of the silicone rubber-solvent formulation. For this formulation more solvent can be included such as to provide a lesser viscosity and hence easier attainment of only a very thin layer. After most of the solvent has evaporated the pieces are then stacked one on top of the other until the desired number of laminations is attained and then pressure is applied sufficient to provide a bond between adjacent layers and the resulting laminated composite is then cured at the curing temperature of the silicone rubber. For use of the resulting composite material in bonding together ceramic or other components to form an assembly, the top and bottom surfaces of the composite material are provided with a very thin layer of the silicone rubber-solvent formulation and the composite material is then pressed between the surfaces of the components desired to be bonded together and the assembly is then complete upon the application of the temperature required for the curing of the thin layers of silicone rubber in contact with the surfaces of the components.

While the invention has been described specifically with reference to use of the composite material as a bonding layer between ceramic or other components of an assembly, it will be understood that the composite material of the present invention has numerous other uses — uses wherever there is requirement for a material having resiliency and a high temperature resistance. As indicated above, a key point of the present invention is that it enables the use of silicone rubber in applications where resiliency is required and where the temperatures will be above those to which the silicone rubber can be exposed without losing resiliency and other properties. This, then, qualifies silicone rubber for many applications where silicone rubber would not otherwise be qualified. Hence, it will be understood that while the invention has been described particularly with reference to preferred embodiments and with reference to a particular use thereof, various changes and modifications may be made all within the full and intended scope of the claims which follow.

The embodiments of the invention in which an exclusive property or privilege is claimed are defined as follows:

1. An assembly comprising two members, at least one of which is ceramic, bonded together by a layer of resilient heat-resistant laminated composite consisting essentially of a plurality of layers of woven graphite cloth bonded together by silicone rubber, said composite containing from about 60% to 90% by volume of said woven graphite cloth and the remainder of said silicone rubber and having resiliency above the temperature at which the silicone rubber loses its resiliency.

2. An assembly as set forth in claim 1 wherein said cloth has a thickness of from 15 to 20 mils and wherein there are from about four to six layers of said cloth for each about one-eighth inch thickness of said composite.

3. An assembly as set forth in claim 1 wherein the silicone rubber does not completely fill the layers of the cloth.

4. An assembly comprising two members having therebetween and in contact therewith a resilient heat-resistant laminated composite consisting essentially of a plurality of layers of graphite cloth bonded together by silicone rubber, said composite containing from about 60% to 90% by volume of said graphite cloth and the remainder of said silicone rubber and having resiliency above the temperature at which the silicone rubber loses its resiliency.

5. An assembly as set forth in claim 4 wherein said cloth is of woven construction.

6. An assembly as set forth in claim 4 wherein each of said cloth layers has a thickness of from about 15 to 20 mils and wherein the composite has from about four to six layers of the cloth for each about one-eighth inch thickness of said composite.

* * * * *